United States Patent
Nomura et al.

(10) Patent No.: US 11,481,011 B2
(45) Date of Patent: Oct. 25, 2022

(54) CONTROL DEVICE, WEARABLE DEVICE, SIGNAL PROCESSING METHOD, AND RECORDING MEDIUM

(71) Applicant: CASIO COMPUTER CO., LTD., Tokyo (JP)

(72) Inventors: Keiichi Nomura, Uenohara (JP); Tsuyoshi Minami, Musashimurayama (JP); Shuhei Uchida, Hamura (JP); Toshiya Sakurai, Tokyo (JP); Hideo Suzuki, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 292 days.

(21) Appl. No.: 16/833,432

(22) Filed: Mar. 27, 2020

(65) Prior Publication Data
US 2020/0319692 A1    Oct. 8, 2020

(30) Foreign Application Priority Data
Apr. 3, 2019 (JP) .............................. JP2019-071398

(51) Int. Cl.
*G06F 1/3287* (2019.01)
*G06F 1/3206* (2019.01)
*G06F 1/16* (2006.01)

(52) U.S. Cl.
CPC ............ *G06F 1/3206* (2013.01); *G06F 1/163* (2013.01); *G06F 1/3287* (2013.01)

(58) Field of Classification Search
CPC ....... G06F 1/3206; G06F 1/163; G06F 1/3287
See application file for complete search history.

(56) References Cited

U.S. PATENT DOCUMENTS

| 5,557,236 | A | * | 9/1996 | Monti | ................ | H03K 19/1732 327/564 |
| 5,995,820 | A | * | 11/1999 | Young | ................ | H04W 52/029 455/343.1 |
| 6,029,061 | A | * | 2/2000 | Kohlschmidt | ...... | H04W 52/029 455/574 |
| 8,103,806 | B1 | * | 1/2012 | Ain-Kedem | ........... | G11C 5/066 710/17 |

(Continued)

FOREIGN PATENT DOCUMENTS

| JP | 2016145805 A | 8/2016 |
| JP | 2017107045 A | 6/2017 |

OTHER PUBLICATIONS

Japanese Office Action (and English language translation thereof) dated Apr. 6, 2021 issued in Japanese Application No. 2019-071398.

(Continued)

*Primary Examiner* — Gary Collins
(74) *Attorney, Agent, or Firm* — Holtz, Holtz & Volek PC

(57) ABSTRACT

An input terminal connected to both a terminal of the first device outputting a signal including a period of a low voltage greater than or equal to a predetermined period and a terminal of the second device outputting a periodic signal alternately repeating a high voltage and a low voltage less than the predetermined period via one signal line is included. When a signal input to the input terminal includes a period of a low voltage greater than or equal to the predetermined period, it is determined that a signal output from the first device is input.

13 Claims, 5 Drawing Sheets

(56) References Cited

U.S. PATENT DOCUMENTS

| | | |
|---|---|---|
| 10,234,800 B2 | 3/2019 | Okuzumi |
| 2005/0221870 A1* | 10/2005 | Erdelyi .................... H03L 1/00 455/574 |
| 2005/0223121 A1* | 10/2005 | Tsai .................... G06F 13/4208 710/2 |
| 2007/0162663 A1* | 7/2007 | Tang .................. G06F 13/4068 710/62 |
| 2017/0168434 A1 | 6/2017 | Okuzumi |

OTHER PUBLICATIONS

Chinese Office Action (and English translation thereof) dated Jan. 26, 2022, issued in counterpart Chinese Application No. 202010198501.0.

* cited by examiner

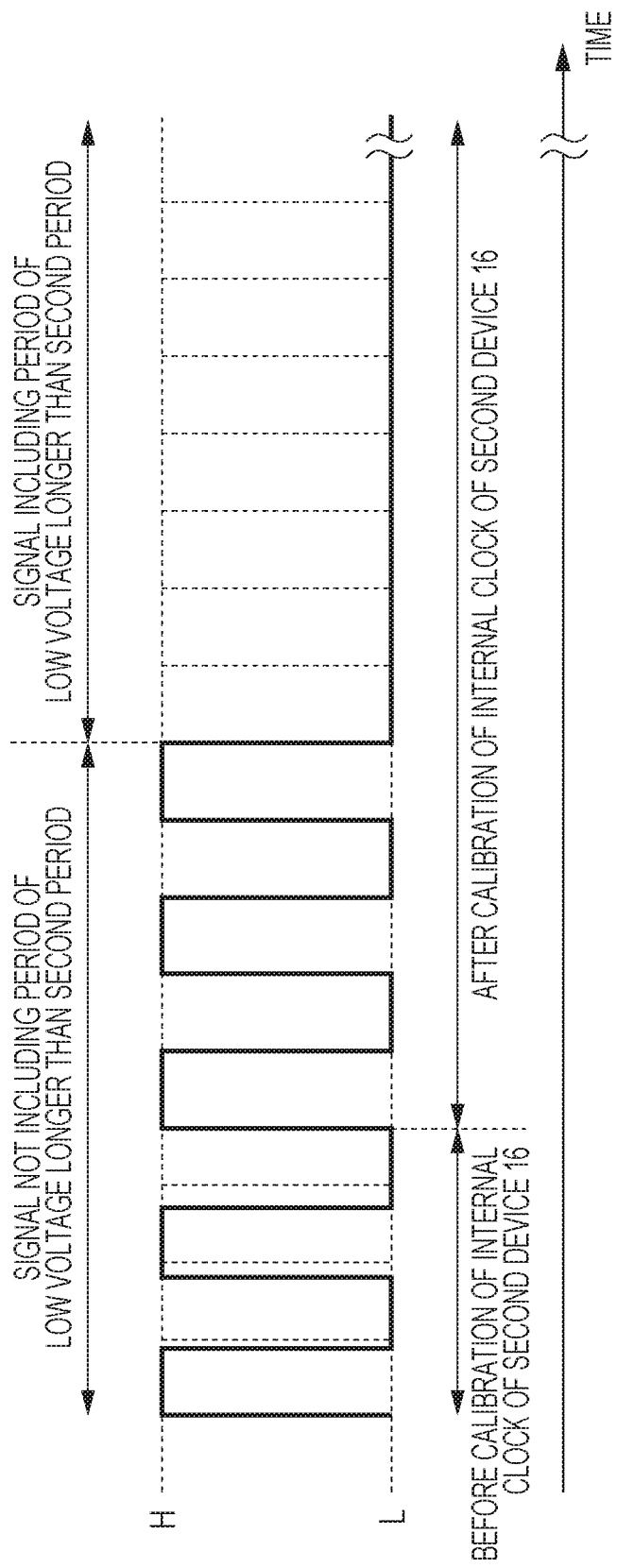

CONTROL DEVICE, WEARABLE DEVICE, SIGNAL PROCESSING METHOD, AND RECORDING MEDIUM

CROSS-REFERENCE TO RELATED APPLICATIONS

This application is based upon and claims the benefit of priority under 35 USC 119 of Japanese Patent Application No. 2019-071398 filed on Apr. 3, 2019 the entire disclosure of which, including the description, claims, drawings, and abstract, is incorporated herein by reference in its entirety.

BACKGROUND OF THE INVENTION

1. Field of the Invention

The present invention relates to a control device, a wearable device, a signal processing method, and a recording medium.

2. Description of the Related Art

As disclosed in JP 2016-145805 A, a wearable device such as an electronic watch or a fitness device has been becoming multifunctional.

In general, as the wearable device become multifunctional, the number of devices such as LSIs or ICs connected to a control device such as a CPU increases, and the number of terminals of the control device becomes insufficient. As a method for solving a shortage of terminals of the control device due to becoming multifunctional, there is a method of changing to a control device having a large number of terminals.

BRIEF SUMMARY OF THE INVENTION

A control device connected to a first device and a second device, includes: an input terminal connected to both (i) a terminal of the first device outputting a signal including a period of a low voltage greater than or equal to a predetermined period and (ii) a terminal of the second device outputting a periodic signal alternately repeating a high voltage and a low voltage less than the predetermined period via one signal line, wherein when a signal input to the input terminal includes a period of a low voltage greater than or equal to the predetermined period, it is determined that a signal output from the first device is input.

A signal processing method executed by a control device connected to a first device and a second device, includes: receiving a signal from an input terminal connected to both a terminal of the first device outputting a signal including a period of a low voltage greater than or equal to a predetermined period and a terminal of the second device outputting a periodic signal alternately repeating a high voltage and a low voltage less than the predetermined period via one signal line; and determining that a signal output from the first device is input when a signal received by the input terminal includes a period of a low voltage greater than or equal to the predetermined period.

A signal processing method executed by a wearable device including a first device, a second device, and a control device connected to the first device and the second device via one signal line, includes: outputting a signal including a period of a low voltage greater than or equal to a predetermined period from the first device; outputting a periodic signal alternately repeating a high voltage and a low voltage less than the predetermined period from the second device; receiving a signal from the signal line by the control device; and determining, by the control device, that a signal output from the first device is input when the signal received from the signal line includes a period of a low voltage greater than or equal to the predetermined period.

BRIEF DESCRIPTION OF THE SEVERAL VIEWS OF THE DRAWING

FIG. 5 is a diagram illustrating a signal input to the control device of the embodiment.

DETAILED DESCRIPTION OF THE INVENTION

Hereinafter, an embodiment will be described with reference to the drawings.

Figure 1:
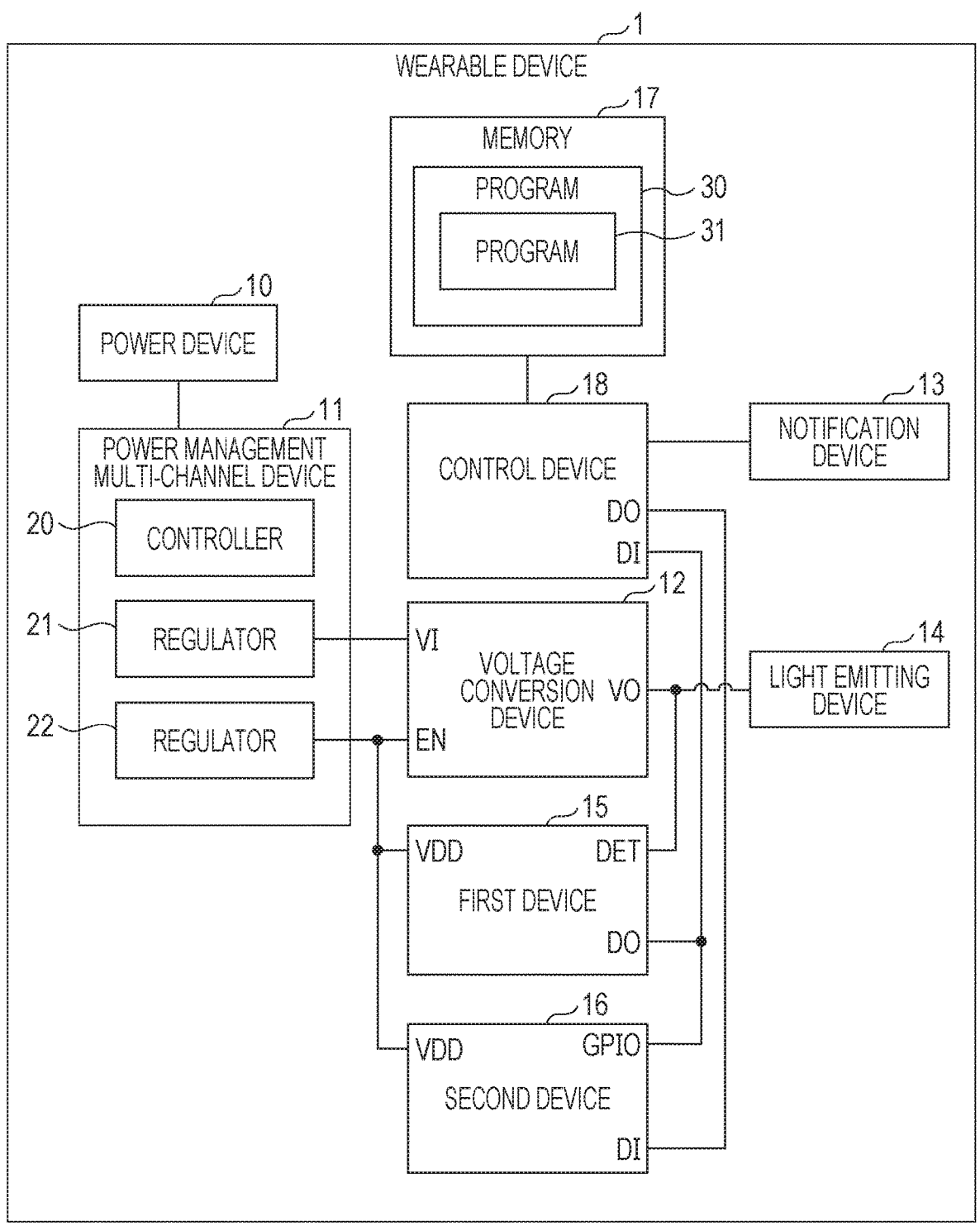
FIG. 1 is a block diagram illustrating a configuration of a wearable device of an embodiment.

FIG. 1 is a diagram illustrating a configuration of a wearable device 1.

The wearable device 1 includes a control device 18, a power device 10, a power management multi-channel device 11, a voltage conversion device 12, a light emitting device 14, a notification device 13, a first device 15, a second device 16, a memory 17, etc.

For example, the wearable device 1 is a device worn on a body of a user such as a wrist, an arm, or a chest of the user. The wearable device 1 can notify the user of information processed by various devices included in the wearable device 1 via the notification device 13.

For example, the power device 10 includes a battery and a voltage conversion circuit. The power device 10 supplies power at an operating voltage of each unit in the wearable device 1.

The power management multi-channel device 11 includes a controller 20, a regulator 21, a regulator 22, etc. The power management multi-channel device 11 is connected to the control device 18 via a communication interface such as an I2C interface. The power management multi-channel device 11 processes a control signal input from the control device 18 via the communication interface using the controller 20, and controls the outputs of the regulator 21 and the regulator 22 according to the control signal. The regulator 21 and the regulator 22 smooth direct current (DC) power input from the power device 10 to a predetermined voltage value, make the voltage constant, and output the voltage.

For example, the voltage conversion device 12 is a device that converts a DC voltage of a DC/DC converter, etc. into a DC voltage having a different value and outputs the DC voltage. The voltage conversion device 12 converts a DC voltage from the regulator 21 input to a voltage input terminal (VI terminal) into a voltage that matches an operating voltage of the light emitting device 14, and outputs the voltage from an output terminal (VO terminal). Further, the voltage conversion device 12 includes an enable terminal (EN terminal). While a voltage of a predetermined voltage value or more is applied to the EN terminal, the voltage conversion device 12 converts the DC voltage from the regulator 21 input to the VI terminal into a voltage and outputs the voltage from the VO terminal. A voltage output from the regulator 22 is applied to the EN terminal.

For example, the notification device 13 is a device that notifies information to a user of a display such as a liquid crystal display (LCD) or an organic electro-luminescent (EL) display, a dial including a motor, a gear, and a hand, or a speaker. The notification device 13 performs a notification operation of notifying the user of information processed by various devices included in the wearable device 1.

The light emitting device 14 is a device that emits light when a voltage of a light emitting diode (LED) is applied. In the wearable device 1, for example, the light emitting device 14 is used as a backlight of the notification device 13 or used in conjunction with an operation of the second device 16.

For example, the first device 15 is a voltage detection device and is a device having a function of detecting a voltage output from the VO terminal of the voltage conversion device 12 using a voltage detection terminal (DET terminal) and monitoring the voltage. For example, when a detected voltage value becomes equal to or less than a predetermined value, the first device 15 outputs a low voltage from an open drain output terminal (DO terminal) to the control device 18.

For example, the second device 16 is a device that outputs a periodic signal such as a clock signal or a signal that alternates between a Hi voltage (high voltage) and a low voltage at a predetermined cycle at least for a certain period of time for the purpose of calibrating a clock of a device thereof such as pulse wave sensor, a heart rate sensor, an optical sensor, or a timing device or for the purpose of being used as a clock of another devices. The second device 16 includes a general-purpose input/output (GPIO) terminal that can be set as an input terminal or an output terminal (including an open drain output terminal). The second device 16 can output a periodic signal at least for a certain period of time from the GPIO terminal set as the open drain output terminal. In addition, for example, in a case in which the second device 16 outputs a periodic signal for the purpose of calibrating the clock of the device thereof, when calibration of an internal clock of the second device 16 is completed, the second device 16 outputs a signal notifying that the calibration of the internal clock of the second device 16 is completed (calibration completion notification signal).

The memory 17 stores a control program, initial setting data, etc. The control program includes a program 30 relating to control of various processes for performing signal processing by the wearable device 1. In addition, the program 30 includes a program 31 relating to control of various processes for performing signal processing by the control device 18. Note that the memory 17 may be provided inside the control device 18.

The control device 18 is a processor that performs various arithmetic processes and controls the overall operation of the wearable device 1. The control device 18 reads a control program from the memory 17, executes the control program, and performs various operation processes for notifying the user via the notification device 13 of information processed by various devices included in the wearable device 1. Further, the control device 18 includes an input terminal (DI terminal) for connecting one signal line connected to both the DO terminal of the first device 15 and the GPIO terminal of the second device 16, and performs control processing according to a signal from the first device 15 and/or the second device 16 input from the DI terminal.

In addition, for example, when the second device 16 is a device that outputs a periodic signal for a certain period of time from the GPIO terminal set as an open drain output terminal for the purpose of calibrating the clock of the device thereof, the control device 18 processes a signal input from the DI terminal of the control device 18 and outputs a signal for calibrating the internal clock of the second device 16 to the second device 16. That is, the control device 18 receives and processes the periodic signal output from the GPIO terminal of the second device 16 at the DI terminal of the control device 18, and generates a signal for calibrating the internal clock of the second device 16. That is, the control device 18 counts a period of a voltage higher than a predetermined high voltage threshold of a voltage of the periodic signal input to the DI terminal of the control device 18 (high voltage period) and a period of a voltage lower than a predetermined low voltage threshold thereof (low voltage period) using the internal clock of the control device 18. Then, the control device 18 outputs a signal for calibrating the internal clock of the second device 16 to the second device 16 from a data output terminal (DO terminal) to match the high voltage period and the low voltage period held by the control device 18, thereby calibrating the internal clock of the second device 16. The high voltage period and the low voltage period used when the control device 18 calibrates the internal clock of the second device 16 are defined as a first period.

Further, the control device 18 holds the first period and a second period in advance. The second period is a period in which a predetermined frequency deviation and a predetermined frequency temperature characteristic of the internal clock of the second device 16 are expected in the first period, and is longer than the first period. For example, the control device 18 holds the first period and the second period in an internal memory (not illustrated) of the control device 18.

In addition, upon detecting that a low voltage is output from the first device 15, the control device 18 outputs a control signal commanding suspension of output of the regulator 22 to the controller 20. A period during which the low voltage is output from the first device 15 is longer than the second period. The low voltage output from the first device 15 is continued until, for example, the power supply to the VDD terminal of the first device 15 is turned OFF.

The control device 18 detects that the low voltage is output from the first device 15 by determining that a signal input to the DI terminal of the control device 18 includes a low voltage period longer than the second period. For example, the control device 18 counts the low voltage period of the signal input to the DI terminal of the control device 18 using the internal clock of the control device 18. When the counted low voltage period is longer than the second period, the control device 18 determines that the signal input to the DI terminal of the control device 18 includes the low voltage period longer than the second period.

Next, an operation of the present embodiment will be described. In the following description, a description will be given of a case in which the second device 16 is a device that outputs a periodic signal in a predetermined period from the GPIO terminal set as the open drain output terminal for calibration of the clock of the device thereof.

Figure 2:
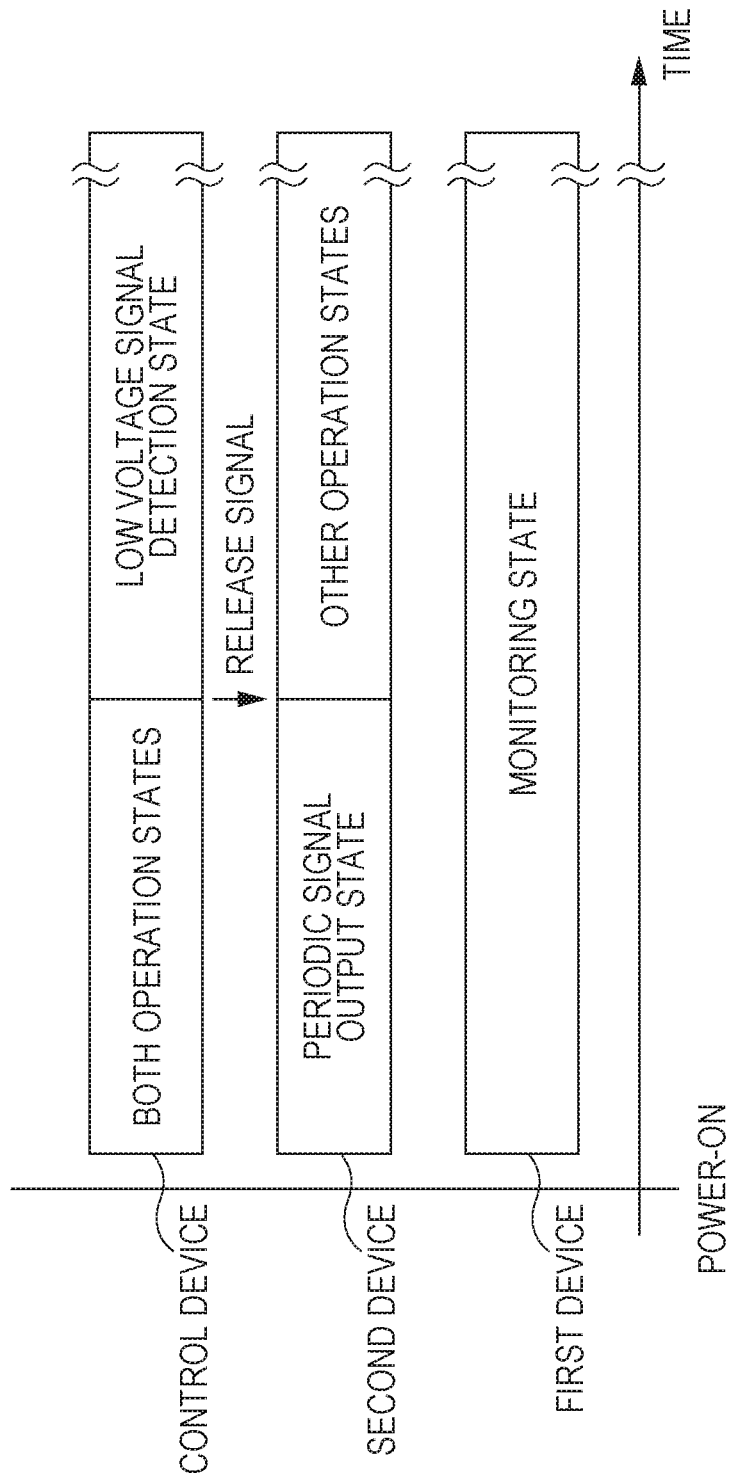
FIG. 2 is a diagram illustrating operation states of a control device, a first device, and a second device of the embodiment.

FIG. 2 is a diagram illustrating an operation state in the present embodiment after elapse of a predetermined time from power-ON of the control device 18, the first device 15, and the second device 16.

When a predetermined time elapses after power-ON, the first device 15 starts monitoring the output voltage of the voltage conversion device 12. When a value of the monitored voltage is equal to or less than a predetermined value, the first device 15 transitions to an operation state (monitoring state) in which a low voltage signal is output from the GPIO terminal to the control device 18. Then, this operation state is maintained until the operation state change control is performed from the control device 18 or the power is turned OFF.

After a predetermined time elapses after power-ON, the second device 16 transitions to an operation state (periodic signal output state) in which the GPIO terminal is set as an open drain output terminal, and a periodic signal is output from this GPIO terminal to the control device 18. Then, when a signal for releasing the GPIO terminal from the setting of the open drain output terminal is received from the control device 18, the state transits to an operation state other than an operation state of outputting a periodic signal to the control device 18 (another operation state). Then, this operation state is maintained until the operation state change control is performed from the control device 18 or the power is turned OFF. For example, as another operation state, there is an operation state in which the GPIO terminal is set as an input terminal and the GPIO terminal waits for some signal input.

The control device 18 can operate in an operation state (state such as periodic signal processing) in which a periodic signal output from the GPIO terminal of the second device 16 is processed and a signal for calibrating an internal clock of the second device 16 is output to the second device 16.

In addition, the control device 18 can operate in an operation state (low voltage signal detection state) in which outputting of a low voltage from the first device 15 is detected and a control signal commanding suspension of output of the regulator 22 is output to the controller 20.

The control device 18 can operate in an operation state (both operation states) in which both an operation in a state such as periodic signal processing and an operation in the low voltage signal detection state are allowed.

In more detail, in both the operation states, the control device 18 can perform an operation of processing a signal input to the DI terminal of the control device 18 to process a periodic signal output by the second device 16 and outputting a signal for calibrating the internal clock of the second device 16, and perform an operation of processing a signal input to the DI terminal of the control device 18 to detect that a low voltage is output from the first device 15 and outputting a control signal for commanding suspension of output of the regulator 22 to the controller 20. In addition, when a period of a low voltage longer than the second period held by the control device 18 in advance is included in the signal input to the DI terminal, the control device 18 detects that the first device 15 outputs the low voltage.

The control device 18 transitions to the both operation states when a predetermined time elapses after power-ON.

Then, in the both operation states, the control device 18 processes the signal input to the DI terminal of the control device 18, and outputs a signal for calibrating the clock of the second device 16 from the DO terminal when the period of the low voltage longer than the second period held by the control device 18 in advance is not included. Then, thereafter, upon receiving a calibration completion notification signal from the second device 16, the control device 18 changes the setting of the GPIO terminal of the second device 16 from the setting of the open drain output terminal to the setting of the input terminal, and causes the second device 16 to transition to another operation state. Thereafter, the control device 18 transitions to the low voltage signal detection state.

In the both operation states, the control device 18 processes the signal input to the DI terminal of the control device 18, and outputs a control signal for commanding suspension of the output of the regulator 22 to the controller 20 when the period of the low voltage longer than the second period held by the control device 18 in advance is included. Then, the both operation states are maintained.

Figure 3:
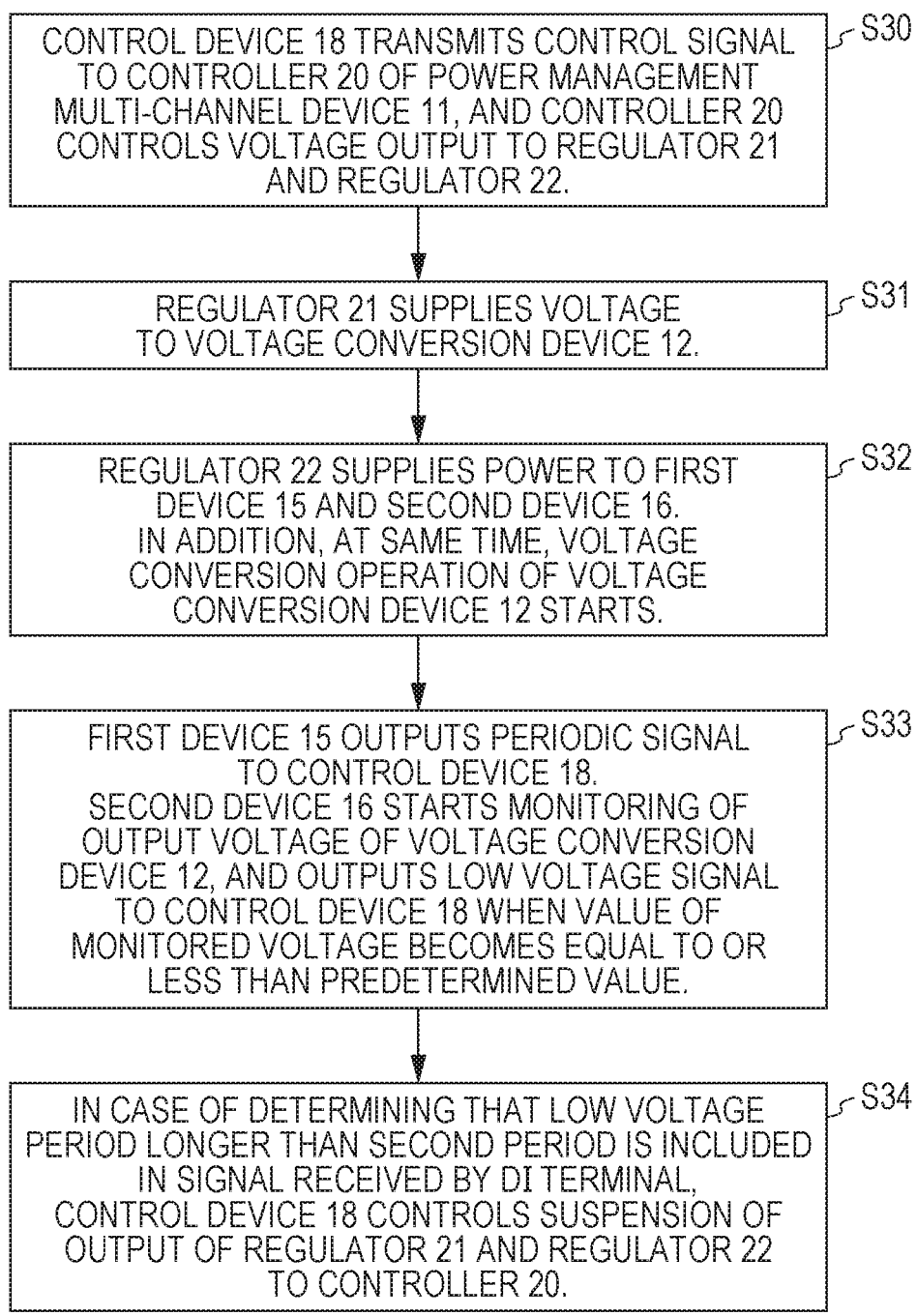
FIG. 3 is a flowchart illustrating an operation of the wearable device of the embodiment.

FIG. 3 is a flowchart of a method for performing signal processing of a plurality of signals in the wearable device 1. This signal processing is an embodiment of a signal processing method for a plurality of signals of the wearable device 1.

After the control device 18 is powered ON and a predetermined time elapses, the signal processing of the plurality of signals of the wearable device 1 is started by the control device 18 reading the program 30 of the signal processing from the memory 17 and the wearable device 1 executing the program 30.

In step S30, the control device 18 outputs a control signal to the controller 20 of the power management multi-channel device 11 via the communication interface. Thereafter, the controller 20 controls the regulator 21 and the regulator 22 to control the voltage output.

In step S31, the regulator 21 supplies a voltage to the VI terminal of the voltage conversion device 12.

In step S32, the regulator 22 supplies power to the first device 15 and the second device 16. In addition, at the same time, the regulator 22 applies a voltage equal to or higher than a predetermined voltage value to the EN terminal of the voltage conversion device 12. In this way, the voltage conversion device 12 starts a voltage conversion operation.

In step S33, the second device 16 outputs a periodic signal to the control device 18. In addition, when monitoring of the output voltage of the voltage conversion device 12 is started, and a value of the monitored voltage is equal to or less than a predetermined value, the first device 15 outputs a low voltage signal to the control device 18. A period of a low voltage of the low voltage signal output from the first device 15 is longer than the second period.

In step S34, when the control device 18 determines that the signal input to the DI terminal of the control device 18 includes a low voltage period longer than the second period, the control device 18 outputs a control signal for suspending the output of the regulator 22 to the controller 20 via the communication interface, and suspends the output of the regulator 22. In more detail, when the control device 18 determines that a signal from the first device 15 and/or the second device 16 input to the DI terminal from one signal line connected to both the DO terminal of the first device 15 and the GPIO terminal of the second device 16 includes the period of the low voltage longer than the second period held by the control device 18 in advance, the control device 18 outputs a control signal for suspending the output of the regulator 22 to the controller 20 via the communication interface, and suspends the output of the regulator 22.

After step S34, the wearable device 1 uses the notification device 13 to notify the user to restart the wearable device 1. Then, when the user restarts the wearable device 1, the wearable device 1 returns to step S30.

Figure 4:
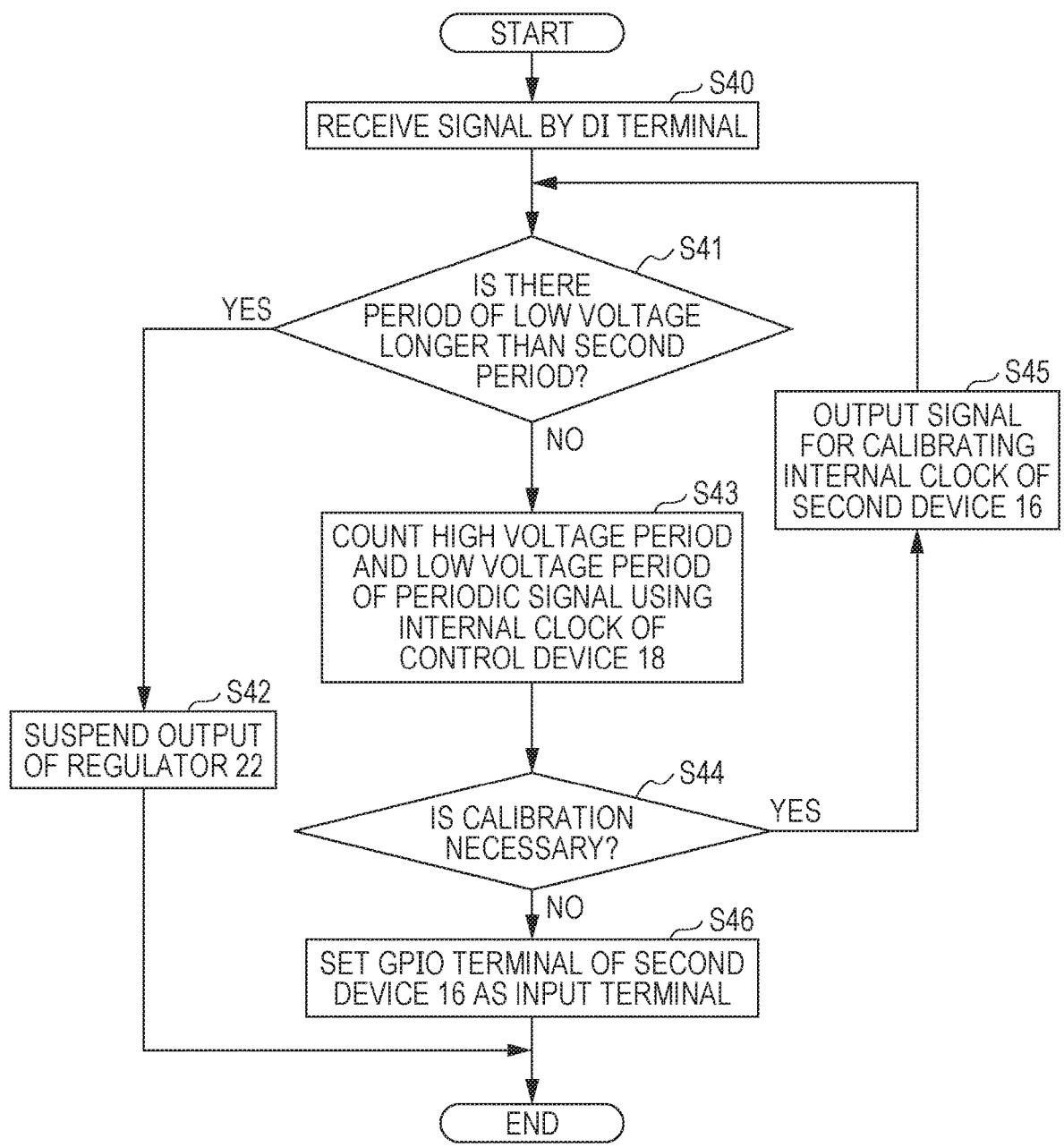
FIG. 4 is a flowchart illustrating a control procedure executed by the control device of the embodiment.

FIG. 4 is a flowchart illustrating a control procedure of signal processing of a plurality of signals executed by the control device 18 of the wearable device 1.

This signal processing is signal processing executed by the control device 18 in signal processing of a plurality of signals of the wearable device 1, and is an embodiment of a signal processing method of the control device 18 for a plurality of signals.

After the control device 18 is powered ON and a predetermined time elapses, the signal processing of the plurality of signals executed by the control device 18 is started by the control device 18 reading the program 31 from the memory 17 and the control device 18 executing the program 31. When this signal processing is started, the control device 18 is in the both operation states, the first device 15 is in the monitoring state, and the second device 16 is in the periodic signal output state.

The DI terminal of the control device 18 is connected to the DO terminal of the first device 15 in the monitoring state and the GPIO terminal of the second device 16 in the periodic signal output state. Then, the control device 18 receives the periodic signal output by the GPIO terminal of the second device 16 (step S40).

The control device 18 determines whether or not the signal input to the DI terminal includes the low voltage period longer than the second period held by the control device 18 in advance (step S41).

As illustrated in FIG. 5, the period of the low voltage of the signal input to the DI terminal of the control device 18 is the same as a period of a low voltage of a periodic signal output to the control device 18 by the second device 16 in a period in which the first device 15 in the monitoring state determines that the value of the voltage monitored at the DET terminal of the first device 15 is not less than or equal to a predetermined value (part of the "signal not including the period of the low voltage longer than the second period" of FIG. 5). That is, in this case, the signal input to the DI terminal does not include the period of the low voltage longer than the second period.

On the other hand, in a period in which the value of the voltage monitored at the DET terminal of the first device 15 is less than or equal to the predetermined value (part of the "signal including the period of the low voltage longer than the second period" of FIG. 5), the signal input to the DI terminal includes the period of the low voltage longer than the second period. Upon determining that the value of the voltage monitored at the DET terminal of the first device 15 is less than or equal to a predetermined value, the first device 15 outputs a low voltage signal from the DO terminal corresponding to the open drain output terminal. Then, the first device 15 maintains this operation state until the operation state change control is performed from the control device 18 or the power is turned OFF. For this reason, a period of the low voltage of the signal input to the DI terminal of the control device 18 in a period in which the first device 15 in the monitoring state determines that the value of the voltage monitored at the DET terminal of the first device 15 is less than or equal to the predetermined value is longer than the second period.

When it is determined that the signal input to the DI terminal of the control device 18 includes the period of the low voltage longer than the second period held in advance by the control device 18 ("Yes" in step S41), the control device 18 outputs a control signal for suspending the output of the regulator 22 to the controller 20 via the communication interface, and suspends the output of the regulator 22 (step S42). Then, the control device 18 ends the signal processing of the plurality of signals.

When it is determined that the signal input to the DI terminal of the control device 18 does not include the period of the low voltage longer than the second period held in advance by the control device 18 ("No" in step S41), the control device 18 counts the high voltage period and the low voltage period of the periodic signal input to the DI terminal of the control device 18 using the internal clock of the control device 18 (step S43).

The control device 18 counts the periodic signal input to the DI terminal of the control device 18 using the internal clock of the control device 18, and determines whether or not it is necessary to calibrate the internal clock of the second device 16 as a result of comparing the count number with the first period (step S44). That is, it is determined whether or not the high voltage period and the low voltage period corresponding to the count number match the first period.

When it is determined that the internal clock of the second device 16 needs to be calibrated ("Yes" in step S44), the control device 18 outputs a signal for calibrating the internal clock of the second device 16 from the DO terminal (step S45). Then, the control device 18 determines whether or not the signal input to the DI terminal includes a period longer than the period of the low voltage of the periodic signal output to the control device 18 by the second device 16 held in advance by the control device 18 (return to step S41).

On the other hand, when the calibration completion notification signal is received from the second device 16 and it is determined that the internal clock of the second device 16 does not need to be calibrated ("No" in step S44), the control device 18 sets the GPIO terminal of the second device 16 as an input terminal (step S46). Then, the control device 18 ends the signal processing of the plurality of signals.

When the control device 18 completes the signal processing of the plurality of signals, the wearable device 1 uses the notification device 13 to notify the user to restart the wearable device 1. Then, when the user restarts the wearable device 1, the control device 18 reads the program 31 from the memory 17 thereafter, the program 31 is executed by the control device 18, and the control device 18 starts signal processing of the plurality of signals.

As mentioned above, when a DI terminal connected to one signal line connected to both the DO terminal of the first device 15 and the GPIO terminal set as the output terminal of the second device 16 is included, and the signal input to the DI terminal includes the period of the low voltage longer than the second period held in advance by the control device 18, the control device 18 of the wearable device 1 of the above embodiment determines that the signal output from the DO terminal of the first device 15 is input. As described above, the control device 18 processes the signal output from the terminal of the first device 15 and the signal output from the terminal of the second device 16 input to one terminal, and determines which of the first device 15 and the second device 16 is to be controlled. In this way, signals output from more terminals of devices such as LSIs or ICs can be recognized using fewer terminals of the control device 18. That is, in general, as the wearable device become multifunctional, the number of devices such as LSIs or ICs connected to a control device such as a CPU increases, and the number of terminals of the control device becomes insufficient. As a method for solving the shortage of terminals of the control device due to multi-functioning, there is a method of changing to a control device having a large number of terminals. However, as the number of terminals of the control device increases, the external size of the control device tends to increase. In a small device such as the wearable device, a selectable size of the control device, that is, the selectable number of terminals of the control device is limited. For this reason, it is desired that a control device mounted on a wearable device recognizes signals output from more terminals of devices such as LSIs or ICs having fewer terminals. According to the invention, signals output from more terminals of devices such as LSIs or ICs can be recognized using fewer terminals of the control device 18.

In addition, after determining that the signal input to the DI terminal includes the period of the low voltage longer than the second period held in advance by the control device 18, the control device 18 outputs a control signal for suspending the output of the regulator 22 to the controller 20 via the communication interface. In this way, the control device 18 processes the signal output from the terminal of the first device 15 and the signal output from the terminal of the second device 16 input to one terminal. When the input signal includes the period of the low voltage longer than the second period held in advance, the control device 18 determines that the first device 15 is outputting a low voltage from the DO terminal to the control device 18, and outputs a control signal for suspending the output of the regulator 22 to the controller 20. That is, when the signal input to the DI terminal includes the period of the low voltage longer than the second period held in advance, for example, the control device 18 determines that the voltage value output from the voltage conversion device 12 becomes equal to or less than the predetermined value, and outputs a control signal for suspending the output of the regulator 22 to the controller 20. In this way, signals output from more terminals of devices such as LSIs or ICs can be processed using fewer terminals of the control device 18. In addition, for example, the control device 18 can detect a state of the voltage output from the voltage conversion device 12 while processing the periodic signal output by the second device 16 using one DI terminal. For example, when there is an abrupt decrease in a voltage output from the voltage conversion device 12, an abrupt increase in a current output from the voltage conversion device 12, etc., the control device 18 can perform appropriate control.

In addition, in the wearable device 1, at least when the signal processing of the wearable device 1 is executed, the DO terminal of the first device 15 is an open drain terminal, and the GPIO terminal of the second device 16 is set as an open drain output terminal. In this way, the output signal of the first device 15 and the output signal of the second device 16 can be combined into one signal line, and the combined one signal line can be connected to the DI terminal of the control device 18. Thus, the control device 18 can receive and process signals output from more terminals of devices such as LSIs or ICs using fewer terminals of the control device 18.

Further, the second device 16 outputs a periodic signal from the GPIO terminal at least for a certain period of time after the signal processing of the wearable device 1 is started. Then, the control device 18 determines whether or not the signal input to the DI terminal of the control device 18 includes a period longer than the second period held in advance by the control device 18. In this way, the control device 18 can perform appropriate control according to the status of the voltage and current output from the voltage conversion device 12 while performing the process of calibrating the internal clock of the second device 16. Thus, the control device 18 can control more LSIs or ICs using fewer terminals of the control device 18.

Note that the invention is not limited to the above embodiment, and various modifications can be made.

For example, it has been described that the control device 18 counts the high voltage period and the low voltage period of the periodic signal input to the DI terminal of the control device 18 using the internal clock of the control device 18. However, the invention is not limited to such a method. For example, the control device 18 may calculate a high voltage period of the periodic signal by counting the number of points exceeding a predetermined high voltage during rising (increasing) of the voltage of the periodic signal (increasing time high voltage exceeding points) and the number of points falling below the predetermined high voltage during falling (decreasing) of the voltage of the periodic signal (decreasing time high voltage falling below points) within a predetermined period. Further, for example, the control device 18 may calculate the high voltage period of the periodic signal by measuring a time interval between adjacent points of the increasing time high voltage exceeding points and the decreasing time high voltage falling below points. In addition, for example, the control device 18 may calculate a low voltage period of the periodic signal by counting the number of points falling below a predetermined low voltage during falling (decreasing) of the voltage of the periodic signal (decreasing time low voltage falling below points) and the number of points exceeding the predetermined low voltage during rising (increasing) of the voltage of the periodic signal (increasing time low voltage exceeding points) within a predetermined period. Alternatively, for example, the control device 18 may calculate the low voltage period of the periodic signal by measuring a time interval between specific points such as a time interval between an increasing time high voltage exceeding point and a subsequent increasing time high voltage exceeding point at specific timing of the voltage of the signal input to the DI terminal, or a time interval between adjacent points of the decreasing time low voltage falling below points and the increasing time low voltage exceeding points within a predetermined period.

In addition, in the above embodiment, for example, it has been described that the control device 18 counts the low voltage period of the signal input to the DI terminal of the control device 18 using the internal clock of the control device 18, and determines that the signal input to the DI terminal of the control device 18 includes the low voltage period longer than the second period when the counted low voltage period is longer than the second period. However, the invention is not limited to such a method. For example, the control device 18 may determine whether or not the signal input to the DI terminal of the control device 18 includes a low voltage period longer than the second period by counting the decreasing time low voltage falling below points of the voltage of the signal input to the DI terminal and the increasing time low voltage exceeding points of the voltage of the signal input to the DI terminal within the predetermined period. Alternatively, for example, the control device 18 may determine whether or not the signal input to the DI terminal of the control device 18 includes the low voltage period longer than the second period by measuring a time interval between specific points such as a time interval between an increasing time high voltage exceeding point and a subsequent increasing time high voltage exceeding point at specific timing of the voltage of the signal input to the DI terminal, or a time interval between adjacent points of the decreasing time low voltage falling below points and the increasing time low voltage exceeding points within a predetermined period.

In addition, in the above embodiment, a description has been given of a case in which the second device 16 is a device that outputs a periodic signal in a predetermined period from the open drain output terminal for calibration of the clock of the device thereof. However, the invention is not limited thereto. For example, the second device 16 may output a periodic signal for a purpose other than the purpose of calibrating the clock of the device thereof as long as the device outputs a periodic signal for a certain period.

Further, in the above embodiment, it has been described that the internal memory of the control device 18 holds the first period and the second period. However, the invention is not limited thereto. For example, the memory 17 may hold the first period and the second period.

In addition, in the above embodiment, the other operation state of the second device 16 has been described as an operation state in which the GPIO terminal is set as the input terminal and the GPIO terminal waits for some signal input. However, the invention is not limited thereto. For example, the other operation state of the second device 16 may correspond to an operation state in which the GPIO terminal is set to a high impedance terminal state.

In addition, in the above embodiment, it has been described that the first device 15 is, for example, a voltage detection device, and the low voltage is output from the DO terminal when the voltage output from the VO terminal of the voltage conversion device 12 is detected at the DET terminal, and a value of the detected voltage is equal to or less than a predetermined value. However, the invention is not limited thereto. For example, the first device 15 may correspond to a current detection device, and the low voltage may be output from the DO terminal when a current output from the VO terminal of the voltage conversion device 12 is detected at the DET terminal, and a value of the detected current is equal to or less than a predetermined value.

In addition, in the above embodiment, it has been described that upon detecting that a low voltage is output from the first device 15, the control device 18 outputs a control signal commanding suspension of output of the regulator 22 to the controller 20. However, the invention is not limited thereto. For example, a period during which the low voltage is output from the first device 15 is longer than the second period. Referring to the low voltage output from the first device 15, for example, when the control device 18 detects that the low voltage is output from the first device 15, the control device 18 may output a control signal for commanding suspension of the output of the regulator 22 and a control signal for commanding suspension of the output of the regulator 21 and the regulator 22 to the controller 20.

In addition, specific configurations, processing contents, and procedures thereof described in the above embodiment can be appropriately changed without departing from the spirit of the invention.

Even though some embodiments of the invention have been described, the scope of the invention is not limited to the above-described embodiments, and includes the scope of the invention described in the claims and equivalents thereof.

What is claimed is:

1. A control device connected to a first device and a second device, the control device comprising:
    an input terminal connected to both (i) a terminal of the first device outputting a signal including a period of a low voltage longer than or equal to a predetermined period and (ii) a terminal of the second device outputting a periodic signal alternately repeating a high voltage and a low voltage for a period shorter than the predetermined period, via one signal line,
    wherein when a signal input to the input terminal includes a period of a low voltage longer than or equal to the predetermined period, it is determined that a signal output from the first device is input, wherein the periodic signal input to the input terminal includes a signal to calibrate a clock signal of the second device.

2. The control device according to claim 1, wherein after determining that a signal from the first device is input, the control device outputs a second signal affecting an operation state of the first device.

3. The control device according to claim 1, wherein after determining that a signal from the first device is input, the control device outputs a third signal affecting an operation state of the second device.

4. The control device according to claim 2, wherein after determining that a signal from the first device is input, the control device outputs a fourth signal affecting an operation state of the second device.

5. The control device according to claim 1, wherein after determining that a signal from the first device is input, the control device outputs a fifth signal for suspending an operation state of the first device.

6. The control device according to claim 1, wherein after determining that a signal from the first device is input, the control device outputs a sixth signal for suspending an operation state of the second device.

7. The control device according to claim 2, wherein after determining that a signal from the first device is input, the control device outputs a seventh signal for suspending an operation state of the second device.

8. A wearable device comprising:
    the control device according to claim 1;
    the first device according to claim 1; and
    the second device according to claim 1,
    the control device determines that when a signal input to the input terminal does not include the period of a low voltage longer than or equal to the predetermined period, the signal input is used for calibrating the clock signal of the second device.

9. The wearable device according to claim 8, wherein the second device comprises a sensor that senses at least a heart rate of a user who wears the wearable device.

10. The wearable device according to claim 8, further comprising:
    a regulator that supplies power to the first device and the second device; and
    a voltage conversion device that converts a voltage output from the regulator,
    wherein the first device detects an output voltage value of the voltage conversion device, and outputs an eighth signal including a period of a low voltage longer than or equal to the predetermined period when the output voltage value is lower than or equal to a predetermined value.

11. The wearable device according to claim 10, wherein after determining that a signal from the first device is input, the control device outputs, to the regulator, an eleventh signal for suspending power supply to the first device and the second device.

12. A signal processing method executed by a control device connected to a first device and a second device, the signal processing method comprising:
    receiving a signal from an input terminal connected to both a terminal of the first device outputting a signal including a period of a low voltage longer than or equal to a predetermined period and a terminal of the second device outputting a periodic signal alternately repeating a high voltage and a low voltage for a period shorter than the predetermined period, via one signal line; and
    determining that a signal output from the first device is input when a signal received by the input terminal includes a period of a low voltage longer than or equal to the predetermined period, wherein the periodic signal input to the input terminal includes a signal to calibrate a clock signal of the second device.

13. A signal processing method executed by a wearable device including a first device, a second device, and a control device connected to the first device and the second device via one signal line, the signal processing method comprising:
- outputting a signal including a period of a low voltage longer than or equal to a predetermined period from the first device;
- outputting a periodic signal alternately repeating a high voltage and a low voltage for a period shorter than the predetermined period from the second device;
- receiving a signal from the signal line by the control device; and
- determining, by the control device, that a signal output from the first device is input when the signal received from the signal line includes a period of a low voltage longer than or equal to the predetermined period, wherein the periodic signal includes a signal to calibrate a clock signal of the second device.

* * * * *